US006548150B1

(12) United States Patent
Ishikawa et al.

(10) Patent No.: US 6,548,150 B1
(45) Date of Patent: Apr. 15, 2003

(54) MEDIUM FOR INK-JET RECORDING

(75) Inventors: Takayuki Ishikawa, Kanagawa (JP); Takeshi Yoshimoto, Shizuoka (JP); Nobuhiro Kubota, Shizuoka (JP); Shinichiro Kobayashi, Shizuoka (JP); Kiyoshi Iwamoto, Shizuoka (JP); Jun Sugiyama, Nagano (JP); Hiroyuki Onishi, Nagano (JP); Yukari Ishikawa, Kanagawa (JP)

(73) Assignees: Seiko Epson Corporation, Tokyo (JP); Tomoegawa Paper Co., Ltd., Tokyo (JP)

( * ) Notice: Subject to any disclaimer, the term of this patent is extended or adjusted under 35 U.S.C. 154(b) by 0 days.

(21) Appl. No.: 09/581,562

(22) PCT Filed: Oct. 20, 1999

(86) PCT No.: PCT/JP99/05791

§ 371 (c)(1), (2), (4) Date: Sep. 25, 2000

(87) PCT Pub. No.: WO00/23283

PCT Pub. Date: Apr. 27, 2000

(30) Foreign Application Priority Data

Oct. 21, 1998 (JP) .......................................... 10-299824
Oct. 27, 1998 (JP) .......................................... 10-305176

(51) Int. Cl.[7] ............................ B32B 27/14; B32B 3/00
(52) U.S. Cl. ........................ 428/195; 428/323; 428/500; 428/522
(58) Field of Search ................................ 428/500, 522, 428/323, 195

(56) References Cited

U.S. PATENT DOCUMENTS

| | | | | | |
|---|---|---|---|---|---|
| 4,741,969 | A | * | 5/1988 | Hayama et al. | 428/514 |
| 5,731,263 | A | * | 3/1998 | Totsuka et al. | 503/227 |
| 6,089,704 | A | * | 7/2000 | Burns et al. | 347/105 |

FOREIGN PATENT DOCUMENTS

| | | | |
|---|---|---|---|
| JP | 61-242871 | A | 10/1986 |
| JP | 62-261476 | A | 11/1987 |
| JP | 08080662 | A | 3/1996 |
| JP | 08169172 | A | 7/1996 |
| JP | 08-174990 | | 7/1996 |
| JP | 08-183242 | | 7/1996 |
| JP | 09001922 | A | 1/1997 |
| JP | 62-278081 | A | 12/1997 |
| JP | 10029369 | A | 2/1998 |
| JP | 10-235992 | | 9/1998 |

* cited by examiner

*Primary Examiner*—Cynthia H. Kelly
*Assistant Examiner*—B. Shewareged
(74) *Attorney, Agent, or Firm*—Scully, Scott, Murphy & Presser

(57) ABSTRACT

A recording medium for ink jet printers having superior recording properties for ink jet printers and having superior surface strength in which recorded images are not easily peeled. Acrylic type copolymer in which at least three components of an A component: (metha)acrylate; a B component: hydroxyalkyl (metha)acrylate; and a C component: antioxidation monomer and/or ultraviolet ray absorptivity monomer are copolymerizing components is contained in a coating solution, an ink receiving layer is provided by coating this solution on a base material, whereby a recording medium for ink jet printers is formed.

4 Claims, No Drawings

MEDIUM FOR INK-JET RECORDING

TECHNICAL FIELD

The present invention relates to recording media, and in particular, relates to recording media for ink jet printers, in which ink absorptivity is superior, surface strength is superior, there is no decrease in density and no changing in color tone in direct sunlight or in room light, and in which ink is quickly absorbed, thereby satisfying future high speed printing technique requirements.

BACKGROUND ART

The use of ink jet printers is further increasing in recent years because they have characteristics such as vividness of recorded images, quiet operation, ease of coloring, and the like. In order to prevent the nozzle from being blocked due to drying of ink, an ink which is difficult to dry must be used in the ink jet printer. As ink having this property, water-soluble ink which is dissolved or dispersed with dye, solvent, additives, or the like, in water, is generally employed. However, a letter or an image formed on the recording medium by using the water-soluble ink is more inferior to that in printed matter using pigment-type inks or to that in silver halide photographs from the viewpoint of water resistance, moisture resistance (having no color changing or fading even if the medium is left under high temperature and high humidity), and light resistance such as shelf-life in a room and resistance to direct sunlight.

In recent years, as ink jet printers become less expensive and high vividness and colorfulness of printed image is anticipated, the requirements for various properties such as light resistance of recorded images, surface strength of recording media for ink jet printers, etc., are gradually becoming severe. Therefore, completely satisfying these various requirements, such as light resistance, surface strength, etc., is an essential goal for recording media for ink jet printers.

In conventional recording media for ink jet printers, improvements in light resistance of recordings of letters, images, etc., in particular, full color recordings, have been proposed; however, they are not yet sufficient. Furthermore, in the recording media for ink jet printers, an ink receiving layer containing many pigment components having superior ink absorbability is formed, and a large amount of ink is used in full color recordings. Surface strength of the ink receiving layer is thereby deteriorated, so that there are problems with respect to surface strength, such as flaking off of the pigment, or peeling of the ink receiving layer, when the media are rubbed on the surface or are bent.

DISCLOSURE OF INVENTION

Therefore, the present invention has been made in view of the above circumstances, and it is an object thereof to provide a recording medium for ink jet printers having superior recording properties for ink jet printers, and having superior light resistance, which did not exist in the past, and having superior surface strength so that recorded images are not easily peeled off.

The inventors have conducted various research with regard to recording media for ink jet printers, and have found that the light resistance and the surface strength of the recording media for ink jet printers are improved very effectively by providing an ink receiving layer containing an acrylic type copolymer in which (metha)acrylate, hydroxyalkyl (metha)acrylate, and antioxidation monomers and/or ultraviolet ray absorption monomers are copolymerizing components.

Therefore, a recording medium for ink jet printers according to the present invention has been made on the basis of the above knowledge, and it is characterized in that an ink receiving layer is provided on a base material, the ink receiving layer contains an acrylic type copolymer in which at least three components, an A component: (metha)acrylate, a B component: hydroxyalkyl (metha)acrylate, and a C component: antioxidation monomer and/or ultraviolet ray absorption monomer are copolymerizing components.

A recording medium for ink jet printers according to the present invention has a structure in which at least one ink receiving layer is laminated on at least one surface of a base material by a laminating method such as a coating method, and the ink receiving layer may consist of two or more layers. If it consists of two or more layers, the acrylic type copolymer of the present invention may be contained in at least either of the layers.

A preferable embodiment according to the present invention has a structure in which two or more ink receiving layers are laminated. A first embodiment is characterized in that the acrylic type copolymer of the present invention is contained in a first ink receiving layer being on a base material side and a second embodiment is characterized in that it is contained in a second ink receiving layer being on a surface side, and these will be explained in detail. The above first ink receiving layer and second ink receiving layer may consist of two or more layers, respectively.

In the first embodiment, the A component: (metha) acrylate is preferably alkyl acrylate, and in the second embodiment, it is preferably dialkylamino alkyl methacrylate. Furthermore, in the second embodiment, not only the above A, B, and C components, but also acrylamide, must be contained as an essential copolymerizing component of the acrylic type copolymer.

1. First Embodiment (1) Base Material

As a base material provided for an ink receiving layer according to the present invention, a base paper which is mixed wood pulp, such as a chemical pulp such as LBKP, NBKP, or the like; mechanical pulp such as GP, PGW, RMP, TMP, CTMP, CMP, CGP, or the like; recycled pulp such as DIP, or the like; etc.; or synthetic fiber pulp such as polyethylene fiber, or the like, as a primary component, with pigment and any type of additive which is typically employed in paper, such as sizing agents, yield improving agents, strengthening agents, or the like, alone or in combination, as necessary, and produced by using any type of paper-making apparatus such as a fourdrinier paper machine, cylinder paper machine, twin wire paper machine, or the like; can be preferably employed. In addition, a base paper provided with starch, polyvinyl alcohol, or the like using a size press; a base paper provided with an anchor coat layer; a coated paper such as art paper, coated paper, cast coat paper, or the like, which is provided with a coat layer on these base papers, can preferably be employed. These base papers and coated papers may be provided with an ink receiving layer directly, and a paper controlled flattening before coating the ink receiving layer, using a calender apparatus such as a machine calender, TG calender, soft calender, or the like, may be employed.

As a base material, a polyolefin resin layer may be provided on the surface of the above-described base paper, and synthetic resin such as polyethylene, polypropylene, polyester, nylon, rayon, polyurethane, or the like; film material comprised of mixture with these; and fiber-formed media of these synthetic resins may be employed.

(2) First Ink Receiving Layer

In this embodiment, as a main component of the binder resin in the first ink receiving layer provided on the base material, acrylic type copolymer in which at least three components consisting of the A component: alkyl acrylate, the B component: hydroxyalkyl (metha)acrylate, and the C component: antioxidation monomer and/or ultraviolet ray absorption monomer are copolymerizing components, is employed. Superior recording properties for ink jet printers can thereby be attained. The first ink receiving layer is formed by adding other binder resins or additives to this acrylic type copolymer and pigment as necessary.

(a) Copolymerizing Component of Acrylic Type Copolymer

Alkyl acrylate of the above A component has effects on film strength, miscibility with pigments, stability of the coating material, etc., and as alkyl acrylate, a chemical compound shown in the following chemical formula 1 can be employed. The content of alkyl acrylate in the acrylic type copolymer is preferably 50 mole % or more. If it is less than 50 mole %, the film strength is insufficient, thereby causing a problem in wear resistance. In the chemical formula 1, $R_1$ refers to an alkyl group having one to six carbon atoms, and especially, ethyl acrylate is preferable in the present invention since it has superior moisture resistance in which color of images do not change or fade even if recorded images are left under high temperature and high humidity.

Chemical Formula 1

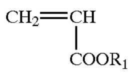

As the hydroxyalkyl (metha)acrylate of the above B component, a chemical compound shown in the following chemical formula 2 can be employed. Hydroxyalkyl (metha) acrylate has an effect in which the dispersibility of the acrylic type copolymer increases and the clarity or the light resistance of images is improved. The content of the B component in the acrylic type copolymer is preferably 1 to 25 mole %. If this content of the B component is more than 25 mole %, a problem occurs in that the water resistance is inferior. In the chemical formula 2, $R_2$ refers to a hydrogen atom or a methyl group, $R_3$ refers to an alkyl group having one to six carbon atoms having a hydroxyl group as a substituent, and it is preferable that this hydroxyl group be in the terminal group. Of these compounds, 2-hydroxyethyl methacrylate is preferably employed in the present invention since the above effect is particularly superior.

Chemical Formula 2

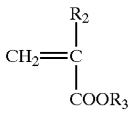

Antioxidation monomer and ultraviolet ray absorption monomer of the above C component has a structure which can polymerize with the above A component and B component. As these monomers, chemical compounds in which a water solubility and a dispersibility are superior, for example, chemical compounds shown in the following chemical formula 3 (antioxidation monomer), and chemical compounds shown in the following chemical formula 4 (ultraviolet ray absorption monomer), can be employed. These compounds can be employed alone or in combination, respectively. However, at least one compound must be contained in the copolymer. Thus, since antioxidation monomer and/or ultraviolet ray absorption monomer are included in the acrylic type copolymer, the obtained light resistance is even more superior than the case in which antioxidant and/or ultraviolet ray absorbing agents are only added to the binder resin. The content of the C component in the acrylic type copolymer is preferably 1 to 20 mole %. If it is more than this range, the image characteristic, in particular, the ink absorptivity, is deteriorated. In the chemical formulas 3 and 4, $R_4$ refers to a hydrogen atom or an alkyl group having one to four carbon atoms, and $R_5$ refers to a hydrogen atom, a methyl group, or an ethyl group. $R_6$ refers to a hydrogen atom, a halogen atom, a hydroxyl group, an alkyl group, an acyl group, an acyloxy group, or an alkoxyl group and the alkyl group, the acyl group, the acyloxy group, or the alkoxyl group has preferably one to three carbon atoms.

Chemical Formula 3

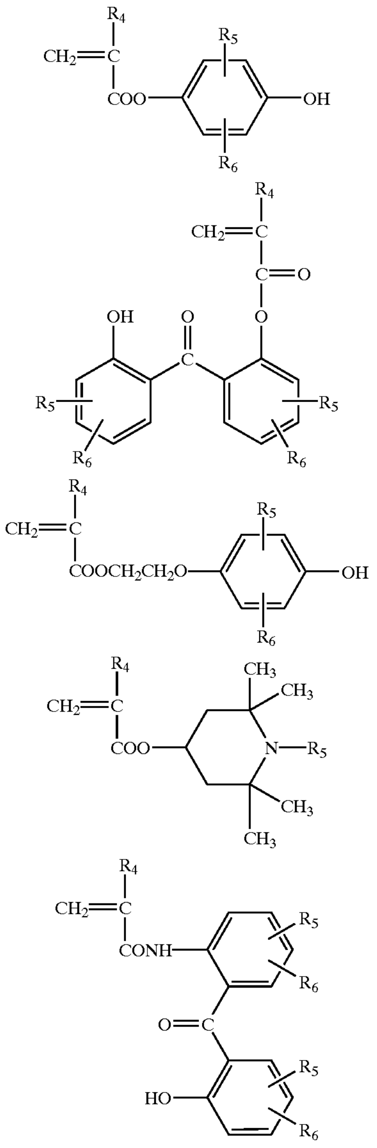

-continued

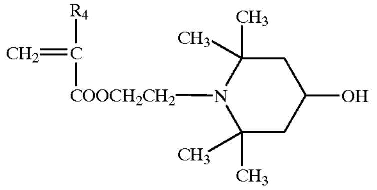

Chemical Formula 4

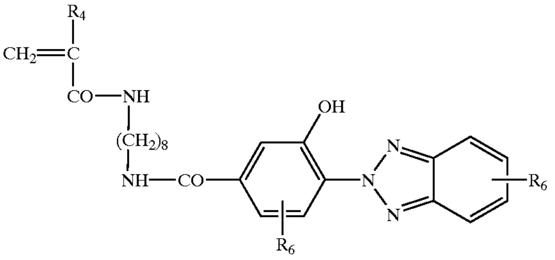

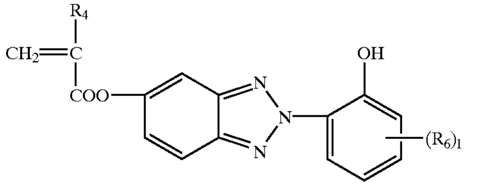

(l = 0,1 or 2)

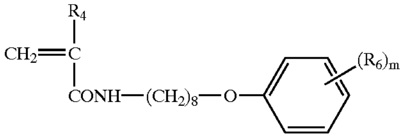

(m = 0,1 or 2)

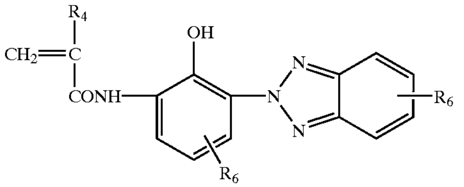

As copolymerizing components of the acrylic type copolymer other than the above A, B, and C components, chemical compounds which do not deteriorate the dispersibility of the acrylic type copolymer and the miscibility with the binder resin and which improve the recording properties for ink jet printers, the light resistance, and the wear resistance, can be added in appropriate amounts. For example, acrylonitrile shown in the following chemical formula 5 can be preferably employed as a copolymerizing component.

Chemical Formula 5

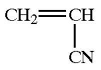

(b) Preparation of Acrylic Type Copolymer

Since alkyl acrylate of the A component is slightly soluble in water, acrylic type copolymer is prepared by the above materials using an emulsion polymerization method, and it is used as an emulsion. The above copolymerizing component is dispersed in water with an emulsifiner, whereby the A component is taken in a micell which is formed by the emulsifiner, so that the emulsion is prepared. As an emulsifiner, at least one of an anionic type, cationic type, and non-ionic type surfactant is employed, generally. In the preparation of the acrylic type copolymer for the present invention, if partially saponified polyvinyl alcohol is used as a protective colloid agent, it also serves as an emulsifiner. Therefore, it is preferable to use partially saponified polyvinyl alcohol. Next, radicals are generated in the water layer by adding a polymerization initiator to this emulsion, and polymerization is initiated. Polymer radicals of low polymerization degree formed there can enter into the micell and can form polymers of high polymerization degree by further polymerizing with the A component. In this method, the rate of polymerization is high since the polymerization is carried out in the micell, and the polymer of high polymerization degree is easily obtained. Furthermore, distribution of molecular weight of the polymer is narrow, and properties of the acrylic copolymer are easily controlled.

Heating temperature for the polymerization is preferably 60 to 100° C., and is more preferably 80 to 90° C. When the heating temperature is too low, weight-average molecular weight increases extremely, whereby the ink absorptivity, etc., is deteriorated. In contrast, when it is too high, a normal polymerization reaction does not occur, whereby by-products are formed. If a polymer in which the weight-average molecular weight is low is used in a first ink receiving layer, the film strength thereof is insufficient.

As a polymerization initiator as described above, well-known radical polymerization initiators can be employed. Specifically, azo type initiators such as 2,2'-azobis-isobutylonitrile, 2,2'-azobis-2-methyl butylonitrile, 1,1'-azobis-1-cyclohexane carbonitrile, dimethyl-2,2'-azobis isobutylate, 2,2'-azobis-(2-amidino propane)-2-hydrochloride, or the like, and peroxide type initiators such as benzoyl peroxide, decanoyl peroxide, acetyl peroxide, t-butyl peroxide, octanoyl peroxide, succinyl peroxide, or the like can be employed. The half-life temperature of these initiators is preferably 60 to 90° C., and is more preferably 65 to 80° C.

(c) Binder Resin

As binder resin contained in a first ink receiving layer according to the present invention, the above acrylic type copolymer is employed as a main component. The acrylic type copolymer is preferably 30 to 100% by weight to the overall binder resin, and is more preferably 40 to 80% by weight. As binder resin which can be employed with the acrylic type copolymer, water soluble or water-dispersive resins can be employed alone or in combination. For example, polyvinyl alcohol, modified polyvinyl alcohol such as carboxyl modified polyvinyl alcohol, vinyl acetate, oxidized starch, etherified starch, casein, gelatin, soybean protein; cellulose derivatives such as carboxymethyl cellulose, hydroxyethyl cellulose, or the like; conjugate diene type copolymer latex such as maleic anhydride resin, styrene-butadiene copolymer, methylmethacrylate-butadiene copolymer, or the like; acrylic type polymer latex such as (metha)acrylate polymer, (metha)acrylate copolymer, or the like; vinylic type polymer latex such as ethylene-vinylacetate copolymer, or the like; functional group modified polymer latex comprised of monomer including functional groups such as carboxy group, or the like of all types of these polymers; water-soluble adhesive consisting of thermosetting synthetic resin such as melamine resin, urea resin, or the like; synthetic resin type adhesive such as polymethylmethacrylate, polyurethane resin, unsaturated polyester resin, vinylchloride-vinylacetate copolymer, polyvinylbutyral, alkyd resin, or the like, can be preferably employed. These can be employed alone or in combination.

(d) Pigment

In a first ink receiving layer according to the present invention, generally used pigments which are insoluble or slightly soluble in water can be employed alone or in combination. For example, a white inorganic pigment such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomite, calcium silicate, magnesium silicate, synthetic amorphous silica, colloidal silica, colloidal alumina, pseudo-boehmite, aluminum hydroxide, alumina, lithopone, zeolite, hydrolytic halloysite, magnesium carbonate, magnesium hydroxide, or the like; an organic pigment such as styrene-type plastic pigment, acrylic-type plastic pigment, polyethylene, urea resin, melamine resin, or the like, etc., can be employed.

Of these pigments, as white pigment which is a primary component contained in a first ink receiving layer, a porous inorganic pigment is preferable since drying properties and absorptivity of an ink for ink jet printers is superior. For example, porous synthetic amorphous silica, porous magnesium carbonate, porous alumina, or the like, are preferably employed. Of these, since both printing quality and shelf-life (water resistance, wear resistance, light resistance, shelf-life in a room, or shelf-life in direct sunlight) are satisfied in the present invention, the precipitation type or the gel type porous synthetic amorphous silica with a specific surface of about 200 to 600 $g/m^2$ can be preferably employed.

With respect to a compounding ratio of pigment and binder resin in the first ink receiving layer, binder resin to pigment is preferably 30:70 to 95:5 by weight ratio, and is more preferably 30:70 to 50:50 by weight ratio.

(e) Other Additives

In order to improved light resistance of images or various properties, a water-soluble divalent or greater metallic salt can be additionally included in a first ink receiving layer. Specifically, magnesium chloride, calcium chloride, barium chloride, tin chloride, lead chloride, magnesium sulfate, calcium sulfate, magnesium chlorate, magnesium phosphate, magnesium nitrate, barium nitrate, calcium nitrate, or the like, can be preferably employed. The metallic salt content to total solid of the first ink receiving layer is preferably 1.0 to 40.0% by weight, and is more preferably 5.0 to 20.0% by weight.

Furthermore, as other additives, pigment dispersing agents, thickeners, flow improving agents, defoaming agents, foaming inhibitors, surface lubricants, foaming agents, penetrating agents, color dyes, color pigments, fluorescent brightening agents, UV absorbers, antioxidants, antiseptics, water resistance agents, hardening agents, or the like, can be blended in appropriate amounts as necessary.

(f) Forming of First Ink Receiving Layer

A coating solution is prepared by dissolving or dispersing the above coating materials in water or a suitable solvent such as alcohol, which can dissolve the materials. The first ink receiving layer is formed on a base material by coating the coating solution, using various kinds of apparatus such as a blade coater, roll coater, air knife coater, bar coater, rod blade coater, size press, or the like on-machine or off-machine in appropriate amounts. The first ink receiving layer may be one layer, or may consist of two layers. If the layer consists of two layers, the above copolymer may be contained into both layers, or may be contained in only the layer being at the surface side.

The coating weight of the first ink receiving layer in the one layer type is preferably 5.0 to 30.0 $g/m^2$. In the case of the two layer type in which two first ink receiving layers are provided on a base material, the coating weight of the first layer is preferably 5.0 to 30.0 $g/m^2$, and is more preferably 5.0 to 20.0 $g/m^2$. In addition, the coating weight of the second layer is preferably 5.0 to 15.0 $g/m^2$, and is more preferably 5.0 to 10.0 $g/m^2$. In the case in which the coating weight is below the above range, superior ink absorptivity or fixativity is seldom obtained. In the case in which it is above this range, problems such as powdering of the layer, decrease of productivity, increase in cost or the like occur. In particular, in the case in which the coating weight of the second layer is more than 15 $g/m^2$, it is difficult for the ink to pass through to the second layer, thereby causing blurring of ink, so that vividness of images is impaired. Thus, it is preferable that the coating weight of the first ink receiving layer be controlled according to the number of the provided ink receiving layers. The coated first ink receiving layer may be finished using a calender such as a machine calender, TG calender, super calender, soft calender, or the like.

(3) Second Ink Receiving Layer

In the present invention, a second ink receiving layer which contains binder resin and pigment and which exists at surface side, can be provided on the above first ink receiving layer. As binder resin for forming the second ink receiving layer, water-soluble resins which can be used in the above first ink receiving layer, can be employed in appropriate amounts. In order to improve recording properties such as ink absorptivity, etc., pigments which can be used in the above first ink receiving layer, are preferably contained with the above binder resin in the second ink receiving layer. Of the pigments, in particular, colloidal silica is preferable, since it has superior dispersibility and has effects on improvement of the stability of coating materials and the productivity thereof.

As material for forming the second ink receiving layer, except the above binder resin and pigment, additives for improving light resistance of images and various properties used in the first ink receiving layer can be mixed in appropriate amounts as necessary. With respect to a compounding ratio of binder resin and pigment in the second ink receiving layer, binder resin to pigment is preferably 5:95 to 30:70 by weight ratio, and is more preferably 5:95 to 20:80 by weight ratio.

A coating solution is prepared by dissolving or dispersing the above coating materials in water or a suitable solvent such as organic solvent. The second ink receiving layer is formed by coating the coating solution on a first ink receiving layer and drying, in the same manner as that of the first ink receiving layer. In the case in which the second ink receiving layer is directly provided on a base material, the coating weight of the second ink receiving layer is preferably 5.0 to 20.0 $g/m^2$. In the case in which it is provided on the first ink receiving layer, the coating weight is preferably 5.0 to 15.0 $g/m^2$, and is more preferably 5.0 to 10.0 $g/m^2$. When the coating weight is more than 15.0 $g/m^2$, it is difficult for ink to pass through to the second ink receiving layer, thereby causing blurring of ink, so that vividness of images is impaired. Furthermore, the second ink receiving layer may be a glossy layer, and may be finished after coating, using a calender such as a machine calender, TG calender, super calender, soft calender, or the like.

2. Second Embodiment

The second embodiment according to the present invention differs from the above first embodiment in the structures of the first ink receiving layer and the second ink receiving layer. In the following, differences between the first embodiment and the second embodiment will be explained in detail. Here, explanations of identical materials such as base material, pigment, additives, etc., and identical means for forming the layers, were omitted.

(1) First Ink Receiving Layer

In a first ink receiving layer of the second embodiment, acrylic type copolymer is not an essential component, and water-soluble resins which can be used with the acrylic type copolymer in the first ink receiving layer of the first embodiment, can be employed as a binder resin. In addition, a compounding ratio of pigment and binder resin in the first ink receiving layer is also different from the first embodiment, and binder resin to pigment is preferably 1:1 to 1:15 by weight ratio, and is more preferably 1:2 to 1:10 by weight ratio.

(2) Second Ink Receiving Layer

A second ink receiving layer in the second embodiment according to the present invention is directly provided on at least one side of a base material or is further provided on the above first ink receiving layer which is provided on at least one side of a base material, as the most surface layer. In binder resin for forming the second ink receiving layer, acrylic type copolymer in which at least the A component: dialkylamino alkylmethacrylate, the B component: hydroxyalkyl (metha)acrylate, the C component: antioxidation monomer and/or ultraviolet ray absorptivity monomer, and acrylamide are copolymer components, must be contained.

In order to improve the recording properties such as ink absorptivity, it is preferable that pigments used in the above first ink receiving layer be contained with the above acrylic type copolymer in the second ink receiving layer. Of the pigments, in particular, colloidal silica is preferable, since it has superior dispersibility and has effects in the improvement of the stability of coating materials and the productivity thereof. In the second ink receiving layer, the same materials as components of the first ink receiving layer can be used as necessary.

(a) Copolymerizing Component of Acrylic Type Copolymer

Dialkylamino alkylmethacrylate of the above A component has effects on film strength, miscibility with pigments, stability of the coating material, etc., and as dialkylamino alkylmethacrylate, a chemical compound shown in the following chemical formula 6 can be employed. The content of dialkylamino alkylmethacrylate in the acrylic type copolymer is preferably 30 to 60 mole %, and is more preferably 40 to 50 mole %. In the chemical formula 6, $R_7$ refers to an alkylene group having one to six carbon atoms, and $R_8$ refers to an alkylene group having one to six carbon atoms; however, dimethylamino ethylmethacrylate is preferable in the present invention, since superior moisture resistance in which the color of images do not change or fade even if recorded images are left under high temperature and high humidity, and a uniform solution can be obtained when the acrylic type copolymer is prepared.

Chemical Formula 6

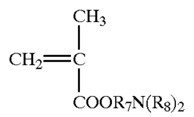

In the second embodiment, in order to further improve the water-solublity and the dispersibility of binder resin, or to maintain the miscibility with pigment, it is necessary that acrylamide be contained as an essential copolymerizing component of the acrylic type copolymer, other than the above A, B, and C components. The content of acrylamide in the acrylic type copolymer is preferably 2 to 7 mole %, and is more preferably 3.5 to 4.5 mole %. If the content is above this range, light resistance is deteriorated.

As hydroxyalkyl (metha)acrylate of the above B component, a chemical compound shown in the following chemical formula 2 as described in the first embodiment, can be employed. Hydroxyalkyl (metha)acrylate has an effect in which the water-solubility and the dispersibility of the acrylic type copolymer increases and the clarity and the light resistance of images is improved. Also in the second embodiment, 2-hydroxyethyl methacrylate is preferably employed, since the above effect is particularly superior. The content of the B component in the acrylic type copolymer is preferably 15 to 50 mole % and is more preferably 20 to 40 mole %. If this content of the B component is more than 50 mole %, a problem occurs in that the water resistance is inferior.

Antioxidation monomer and ultraviolet ray absorption monomer of the above C component has a structure which can polymerize with the above A component and B component. As these monomers, chemical compounds in which the water-solubility and the dispersibility are superior, for example, chemical compounds shown in the following chemical formula 3 (antioxidation monomer) and chemical formula 4 (ultraviolet ray absorption monomer) as described in the first embodiment, can be employed. These compounds can be employed alone or in combination, respectively. However, at least one compound must be contained in the acrylic type copolymer. Also in this second embodiment, it is preferable that antioxidation monomer and/or ultraviolet ray absorption monomer be included in the water-soluble acrylic type copolymer. The content of the C component in the acrylic type copolymer is preferably 0.5 to 10 mole %. If it is above this range, the image characteristic, in particular, the ink absorptivity, is deteriorated.

Furthermore, as copolymerizing components of the acrylic type copolymer other than the above copolymerizing components, chemical compounds which do not deteriorate the water-solubility and the dispersibility of binder resin and the miscibility with the binder resin and which improve the recording properties for ink jet printers, the light resistance, and the wear resistance, can be added in appropriate amounts. For example, dimethoxy polyethyleneglycol methacrylate shown in the following chemical formula 7 can be preferably employed as a copolymerizing component, whereby more superior light resistance can be obtained in the second ink receiving layer. In chemical formula 7, n refers to an integer.

Chemical Formula 7

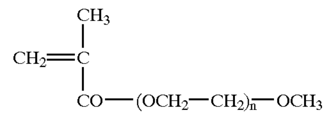

(b) Preparation of Acrylic Type Copolymer

Preparation of the acrylic type copolymer can be carried out using a well-known general apparatus. The above copolymerizing components are dissolved in polymerization solvent; polymerization initiator is added in this solution; and then they are heated at 60 to 100° C., preferably at 80 to 90° C. Whereby, acrylic type copolymer in which weight-average molecular weight is several thousand to 100,000, preferably 10,000 to 20,000, is formed. When the heating temperature is too low, weight-average molecular weight increases extremely, whereby the ink absorptivity, etc., is deteriorated. In contrast, when it is too high, a normal polymerization reaction is not generated, whereby by-products are formed. If a polymer in which the weight-average molecular weight is low is used in a second ink receiving layer, the film strength thereof is insufficient.

As a polymerization solvent as described above, water, alcohol, water-soluble ketone, and solutions of mixtures of these solvents can be employed. Of these solvents, mixed solution of water/alcohol is preferable, and in particular, a mixed solution of water/isopropanol is preferable. With respect to the mixing ratio, ratio of water/alcohol is preferably 4/1 to 1/1, and is more preferably 2/1. As a polymerization initiator, well-known radical polymerization initiators for water-soluble acrylic resins can be employed. Specifically, initiators as described in the first embodiment can be preferably employed.

Best Mode for Carrying Out the Invention

The effects according to the present invention will be illustrated by explanations of the Examples and the Comparative Examples. As a base material, wood-free paper having a basic weight of 90.0 g/m$^2$ was employed in each Example and in each Comparative Example. The coating volumes of both a first ink receiving layer and a second ink receiving layer were 10.0 g/m$^2$. In the Examples, the weight ratio of dried solid was used.

EXAMPLE 1

Preparation of Acrylic Type Copolymer 171 g of materials of acrylic type copolymer which removes B component from the following compounding, 0.72 g of potassium persulfate, and 7.2 g of partially saponified PVA (trade name: Kuraray Poval PVA-217 E; produced by Kuraray Co., Ltd.) as emulsifiner and protective colloid agent, were dispersed in 172.8 g of water, and this mixture was stirred at 3,000 rpm for 2 minutes, whereby an emulsion was prepared. 10 g of this emulsion was mixed with 0.18 g of potassium persulfate, 0.36 g of sodium hydrogencarbonate and 79.2 g of water, and was heated to 80±2° C. in a nitrogen atmosphere. Next, a solution in which the rest of the above emulsion was mixed with 9.0 g of the following B component was added dropwise to the heated mixture for 2 hours, and then the mixture was mixed with an aqueous solution in which 0.18 g of potassium persulfate was dissolved in 18 g of water, and was heated at 85±2°C. for 2 hours. This reaction solution was cooled and was adjusted to a pH value of 7 to 8 by aqueous ammonia, and then the solution was filtrated by a wire screen of 150 mesh, whereby a copolymer of acrylic-water emulsion having a weight-average molecular weight of about 300,000 which polymerized the following copolymerization component at the following proportion, was prepared. Here, the compounding proportion of acrylic type copolymer is shown by mole %.

Compounding of Acrylic Type Copolymer

A component

Ethylacrylate, 54.5 mole %

B component

2-Hydroxy ethylmethacrylate, 13.4 mole %

C component

UV absorptivity monomer represented by the following chemical formula 8, 1.0 mole %

Chemical Formula 8

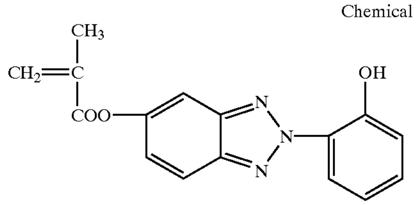

Antioxidation monomer represented by the following chemical formula 9, 8.0 mole %

Chemical Formula 9

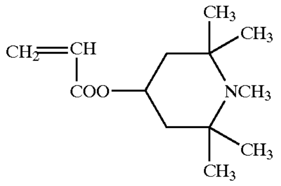

Other component

Acrylonitrile, 22.1 mole %

Forming First Ink Receiving Layer

Next, a coating solution for a first ink receiving layer of the following compounding was coated on one side of a base material, and was dried, whereby a first ink receiving layer was provided.

Coating Solution for First Ink Receiving Layer

Binder resin

The above copolymer of acrylic-water emulsion (solid concentration: 41% by weight), 30 weight parts Itaconic acid modifed PVA (trade name: KL-318 K; produced by Kuraray Co., Ltd.), 9 weight parts Silica (trade name: Mizukasil P78D; produced by Mizusawa Industrial Chemicals Ltd.), 39 weight parts Cationic dye fixing agent (trade name: Polyfix550; produced by Showa Highpolymer Co., Ltd.), 3.5 weight parts Magnesium chloride (trade name: Magnesium Chloride S; produced by Tomita Pharmaceutical Co., Ltd.), 2.5 weight parts Water, 156 weight parts Forming Second Ink Receiving Layer Next, a coating solution for a second ink receiving layer of the following compounding was coated on one side of the above first ink receiving layer, and was dried, whereby a second ink receiving layer was provided. Therefore, a recording medium for ink jet printer according to the present invention was formed.

Coating Solution for Second Ink Receiving Layer

Partially Saponified PVA (trade name: Gohsenal T-330; produced by The Nippon Synthetic Chemical Industry Co., Ltd.), 10 weight parts Colloidal Silica (trade name: Snowtex UP; produced by Nissan Chemical Industries, Ltd.), 90 weight parts

EXAMPLES 2 to 5, and Comparative Examples 1 to 5

Recording media for ink jet printers of Examples 2 to 5 according to the present invention and Comparative Examples 1 to 5 were obtained in the same manner as Example 1, except that the proportions of the acrylic type copolymer materials were changed to the proportions shown in Table 1.

EXAMPLE 6

Forming First Ink Receiving Layer

A coating solution for a first ink receiving layer of the following compounding was dissolved and dispersed in water, and this coating solution was coated on one side of a base material and was dried, whereby a first ink receiving layer was provided.

Coating Solution for First Ink Receiving Layer

Binder resin

Itaconic acid modifed PVA (trade name: KL-318 K; produced by Kuraray Co., Ltd.), 39 weight parts Silica (trade name: Mizukasil P78D; produced by Mizusawa Industrial Chemicals Ltd.), 39 weight parts Cationic dye fixing agent (trade name: Polyfix550; produced by Showa Highpolymer Co., Ltd.), 19.5 weight parts Magnesium chloride (trade name: Magnesium Chloride S; produced by Tomita Pharmaceutical Co., Ltd.), 2.5 weight parts Preparation of Acrylic Type Copolymer Next, materials for acrylic type copolymer of the following compounding were dispersed in water/isopropanol (2/1) so as to be solid concentration of 40% by weight, and 5.0% by weight of azoisobutyronitrile was added in this mixture as a polymerization initiator. Then these were heated at 80 to 90° C., whereby an acrylic type copolymer having a weight-average molecular weight of 15,000 to 20,000 was prepared. Here, a compounding proportion of acrylic type copolymer is shown by mole %.

Compounding of Acrylic Type Copolymer

A component

Dimethylamino ethylmethacrylate, 47.6 mole %

B component

2-Hydroxy ethylmethacrylate, 23.8 mole %

2-Hydroxy ethylacrylate, 23.6 mole %

C component

UV absorptivity monomer represented by the following chemical formula 10, 1.0 mole %

Chemical Formula 10

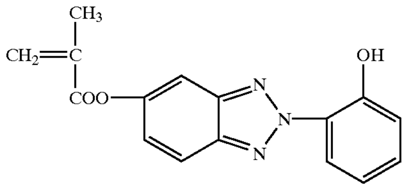

Other component

Acrylamide, 4.0 mole %

Forming Second Ink Receiving Layer

Next, a coating solution for a second ink receiving layer of the following compounding was coated on the above first ink receiving layer, and was dried, whereby a second ink receiving layer was provided. Therefore, a recording medium for ink jet printer according to the present invention was formed.

Coating Solution for Second Ink Receiving Layer

The above acrylic type copolymer (solid concentration: 40% by weight), 10% by weight Colloidal Silica (trade name: Snowtex UP; produced by Nissan Chemical Industries, Ltd.; solid concentration: 39% by weight), 90% by weight

EXAMPLES 7 TO 14, and Comparative Examples 6 to 11

Recording media for ink jet printers of Examples 7 to 14 according to the present invention and Comparative Examples 6 to 11 were obtained in the same manner as Example 6, except that the proportions of the acrylic type copolymer materials were changed to the proportions shown in Table 1. Here, antioxidation monomer used in some Examples and Comparative Examples, and dimethoxy polyethylene glycol #1000 methacrylate as a copolymerizing component of acrylic type copolymer other than the A, B, and C components, are shown by the following chemical formulas 11 and 12, respectively.

| | A Component | | B Component | | C Component | | Other Additives | | |
|---|---|---|---|---|---|---|---|---|---|
| | Ethylacrylate | Dimethylamino Ethylmethacrylate | 2-Hydroxy Ethylmethacrylate | 2-Hydroxy Ethylacrylate | UV Absorption Monomer | Antioxidation Monomer | Acrylamide | Acrylonitrile | Dimethoxy Polyethylene Glycol #1000 Methacrylate |
| Example 1 | 54.5 | — | 13.4 | — | 1.0 | 8.0 | — | 22.1 | — |
| Example 2 | 54.5 | — | 2.7 | — | 7.4 | — | — | 35.4 | — |
| Example 3 | 53.5 | — | 13.4 | — | 4.5 | 4.5 | — | 24.1 | — |
| Example 4 | 65.1 | — | 18.4 | — | 11.0 | 5.5 | — | — | — |
| Example 5 | 54.0 | — | 18.4 | — | 19.6 | 8.0 | — | — | — |
| Example 6 | — | 47.6 | 23.8 | 23.6 | 1.0 | — | 4.0 | — | — |
| Example 7 | — | 44.3 | 22.3 | 22.1 | 7.5 | — | 3.8 | — | — |
| Example 8 | — | 43.8 | 21.8 | 21.6 | 9.5 | — | 4.0 | — | — |
| Example 9 | — | 44.3 | 22.3 | 22.1 | 4.75 | 4.75 | 3.8 | — | — |
| Example 10 | — | 45.45 | 25.86 | — | — | 7.5 | 4.1 | — | 17.09 |
| Example 11 | — | 44.95 | 24.86 | — | — | 9.5 | 4.1 | — | 16.59 |
| Example 12 | — | 45.45 | 12.93 | 12.93 | 4.75 | 4.75 | 4.1 | — | 17.09 |
| Example 13 | — | 27.9 | 14.1 | 13.9 | 20.0 | 20.0 | 4.1 | — | — |
| Example 14 | — | 37.95 | 28.36 | — | 20.0 | — | 4.1 | — | 9.59 |
| Comparative Example 1 | 58.9 | — | 2.9 | — | — | — | — | 38.2 | — |
| Comparative Example 2 | 53.5 | — | 13.4 | — | — | — | — | 33.1 | — |
| Comparative Example 3 | 54.5 | — | — | — | — | — | — | 45.5 | — |
| Comparative Example 4 | 54.0 | — | — | — | 19.6 | 8.0 | — | 18.4 | — |

-continued

| | A Component | | B Component | | C Component | | Other Additives | | |
|---|---|---|---|---|---|---|---|---|---|
| | Ethyl-acrylate | Dimethylamino Ethylmethacrylate | 2-Hydroxy Ethylmethacrylate | 2-Hydroxy Ethylacrylate | UV Absorption Monomer | Antioxidation Monomer | Acryl-amide | Acrylo-nitrile | Dimethoxy Polyethylene Glycol #1000 Methacrylate |
| Comparative Example 5 | 53.5 | — | — | — | 2.0 | 8.0 | — | 35.5 | — |
| Comparative Example 6 | — | 86.5 | — | — | 9.5 | — | 4.0 | — | — |
| Comparative Example 7 | — | 33.1 | — | — | 4.75 | 4.75 | 4.1 | — | 55.3 |
| Comparative Example 8 | — | 32.1 | — | — | — | 9.5 | 4.1 | — | 54.3 |
| Comparative Example 9 | — | 95.9 | — | — | — | — | 4.1 | — | — |
| Comparative Example 10 | — | 47.9 | 24.1 | 23.9 | — | — | 4.1 | — | — |
| Comparative Example 11 | — | 47.95 | 38.36 | — | — | — | 4.1 | — | 9.59 |

Chemical Formula 11

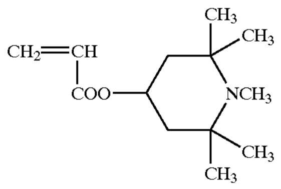

Chemical Formula 12

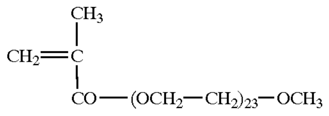

Subsequently, with regard to the recording media for ink jet printers obtained in Examples 1 to 14 and the comparative recording media for ink jet printers obtained in Comparative Example 1 to 11, the objects for evaluation such as a color patch or the like were printed on the second ink receiving layer, using an ink jet printer (trade name: PM-700C; produced by Seiko Epson Corporation), thereby obtaining printed images. Light resistance, surface strength, and ink absorptivity were evaluated by the means described below using these printed images.

Evaluation Means

Light Resistance 1 (Xenon Lamp Accelerated Test)

As an exposure test, a magenta color patch on each recording medium for ink jet printers of the Example or the Comparative Example was irradiated by UV radiation at 90 kJ/$m^2$ under the conditions black panel temperature: 65° C.; relative humidity: 50%; radiation power of ultraviolet at 340 nm: 0.35 W/$m^2$, using a xenon whether-ometer (trade name: Ci-5000; produced by Atlas Electric Devices Co.). Then, the remaining ratio of refraction density was obtained by measuring refraction density of the exposed magenta color patch and the original, using a spectrophotometer (trade name: GRETAG SPM50; produced by Gretag Macbeth Corporation). The light resistance 1 was thereby evaluated.

Light Resistance 2 (Fluorescent Lamp Accelerated Test)

As an exposure test, each recording medium for ink jet printers of the Example or the Comparative Example was irradiated at about 6 W/$m^2$ (at ultraviolet ray ranges of 300 to 400 nm) for 150 hours, using a fluorescent lamp accelerated tester (trade name: HPUV; produced by Atlas Electric Devices Co.). Then, the remaining ratio of refraction density was obtained by measuring refraction density of the exposed magenta color patch and the original, using a spectrophotometer (trade name: GRETAG SPM50; produced by Gretag Macbeth Corporation), in the same manner as a xenon lamp accelerated test of the light resistance 1. The light resistance 2 was thereby evaluated.

Light Resistance 3 (Sunlight and Real Environment Test)

Yellow, magenta, cyan, and black color patches were printed on each recording medium for ink jet printers of the Example or the Comparative Example, and these color patches were left near a window facing south for about 1 month. Thereafter, the remaining ratios of the refraction density were obtained on these color patches, in the same manner as light resistance 1, and the light resistance 3 was evaluated by the average of the remaining ratio.

Surface Strength (Adhesive Property)

A piece of cellophane tape was adhered on the second ink receiving layer formed images, and it was pulled off, whereby surface strength was evaluated according the following criteria.

Evaluation of Surface Strength

A: cases where the problem was not observed at all in practice and surface strength was superior (nothing adhered to the cellophane tape)

B: cases where the problem was not observed in practice and surface strength was superior (a few fragments adhered to the cellophane tape, but no part of the recorded image tore off)

C: cases where surface strength was inferior in practice (at least a part of recorded image tore off)

Ink Absorptivity

Images were printed on the recording sheet by an ink jet printer and the ink absorptivity was evaluated by observing multicolor bleeding and unicolor bleeding thereon. The evaluation was performed by comparing the ink absorptivities of genuine glossy papers (trade name: glossy paper for super-fine (thick-type) photoprint paper; produced by Seiko Epson Corporation) by visual inspection.

Evaluation of Ink Absorptivity

A: cases where the problem was not observed at all in practice and ink absorptivity was superior (equal to or better)

B: cases where the problem was not observed in practice and ink absorptivity was superior (it was sightly inferior, but differences in the SCID image was nt observed)

C: cases where ink absorptivity was inferior in practice These evaluated results are shown in Table 2.

| | Light Resistance 1 (%) | Light Resistance 2 (%) | Light Resistance 3 (%) | Surface Strength | Ink Absorptivity |
|---|---|---|---|---|---|
| Example 1 | 93 | 95 | 96 | A | A |
| Example 2 | 92 | 94 | 95 | A | A |
| Example 3 | 94 | 92 | 93 | A | A |
| Example 4 | 96 | 92 | 97 | A | A |
| Example 5 | 92 | 94 | 93 | B | A |
| Example 6 | 90 | 91 | 92 | A | A |
| Example 7 | 95 | 93 | 92 | A | A |
| Example 8 | 91 | 94 | 94 | A | A |
| Example 9 | 93 | 91 | 91 | A | A |
| Example 10 | 92 | 93 | 94 | A | A |
| Example 11 | 94 | 90 | 91 | A | A |
| Example 12 | 91 | 93 | 90 | A | A |
| Example 13 | 82 | 81 | 83 | B | B |
| Example 14 | 81 | 82 | 81 | B | B |
| Comparative Example 1 | 53 | 51 | 55 | B | A |
| Comparative Example 2 | 58 | 54 | 55 | B | A |
| Comparative Example 3 | 51 | 50 | 52 | C | B |
| Comparative Example 4 | 93 | 90 | 95 | C | B |
| Comparative Example 5 | 91 | 93 | 95 | C | B |
| Comparative Example 6 | 79 | 76 | 78 | C | C |
| Comparative Example 7 | 77 | 78 | 78 | C | C |
| Comparative Example 8 | 79 | 77 | 77 | C | C |
| Comparative Example 9 | 68 | 69 | 66 | C | C |
| Comparative Example 10 | 78 | 76 | 79 | C | C |
| Comparative Example 11 | 76 | 77 | 76 | C | C |

As is apparent from the results in Table 2, every one of the recording media for ink jet printers according to the present invention, has superior properties. In addition, in Example 5 in which the content of the C component is high, the surface strength was slightly deteriorated, and in Examples 13 and 14 in which the content of the A and C components or the content of the C component deviates from a suitable range, any or all of the light resistance, surface strength, and ink absorptivity were slightly deteriorated; however, these deteriorations were not problems encountered in practice. In contrast, in the Comparative Examples in which essential copolymerizing components were not completed, any or all of the light resistance, surface strength, and ink absorptivity were inferior. In particular, the surface strength and ink absorptivity in Comparative Examples 3 to 11 were extremely inferior, and these recording media for ink jet printers could not be used in practice.

As explained above, according to the present invention, by including acrylic type copolymer in which at least three components of the A component: (metha)acrylate; the B component: hydroxyalkyl (metha)acrylate; and the C component: antioxidation monomer and/or ultraviolet ray absorptivity monomer are copolymerizing components, a recording medium for ink jet printers having superior recording properties for ink jet printers in which clear images having no blurring can be obtained by superior ink absorptivity and in which superior light resistance and surface strength are exhibited, can be formed. Furthermore, according to the present invention, by using the above specific copolymer, the moisture resistance in which color of images do not change or fade even if recorded images are left under high temperature and high humidity, can be also improved.

What is claimed is:

1. A recording medium for ink jet printers comprising an ink receiving layer provided on a base material, said ink receiving layer including an acrylic copolymer comprising four components: a dialkylamino alkylmethacrylate, a hydroxyalkyl (meth)acrylate, an antioxidation monomer and/or an ultraviolet ray absorptivity monomer and acrylamide, as a copolymerizing component, said ink jet receiving layer including a pigment present in a concentration such that said acrylic copolymer to said pigment compounding weight ratio is in the range of between 5:95 and 30:70.

2. A recording medium for ink jet printers as recited in claim 1 wherein said antioxidation monomer and/or said ultraviolet ray absorptivity monomer in said acrylic copolymer is present in a concentration of 0.5 to 10 mole %.

3. A recording medium for ink jet printers as recited in claim 1 wherein said dialkylamino alkylmethacrylate in said acrylic copolymer is present in a concentration of 30 to 60 mole % and said acrylamide is present in a concentration of 2 to 7 mole %.

4. A recording medium for ink jet printers as recited in claim 1 wherein said hydroxyalkyl (meth)acrylate in said acrylic copolymer is present in a concentration of 15 to 50 mole %.

* * * * *